United States Patent
Minervino et al.

(10) Patent No.: US 11,891,913 B2
(45) Date of Patent: Feb. 6, 2024

(54) COMPOSITE PLATFORM FOR A FAN OF AN AIRCRAFT TURBINE ENGINE

(71) Applicant: SAFRAN AIRCRAFT ENGINES, Paris (FR)

(72) Inventors: Matteo Minervino, Moissy-Cramayel (FR); Didier Fromonteil, Moissy-Cramayel (FR); Hervé Grelin, Moissy-Cramayel (FR); Damien Bruno Lamouche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/908,037

(22) PCT Filed: Feb. 19, 2021

(86) PCT No.: PCT/FR2021/050298
§ 371 (c)(1),
(2) Date: Aug. 30, 2022

(87) PCT Pub. No.: WO2021/176161
PCT Pub. Date: Sep. 10, 2021

(65) Prior Publication Data
US 2023/0108760 A1 Apr. 6, 2023

(30) Foreign Application Priority Data
Mar. 3, 2020 (FR) ...................................... 2002128

(51) Int. Cl.
*F01D 5/02* (2006.01)
*F01D 11/00* (2006.01)

(52) U.S. Cl.
CPC ............ *F01D 5/021* (2013.01); *F01D 11/008* (2013.01); *F05D 2220/36* (2013.01)

(58) Field of Classification Search
CPC ................................. F01D 5/02; F01D 11/008
See application file for complete search history.

(56) References Cited

U.S. PATENT DOCUMENTS 8,297,931 B2 * 10/2012 Read ..................... F01D 11/008
416/500
9,845,699 B2 * 12/2017 Feeney ................... B29C 70/68
(Continued)

FOREIGN PATENT DOCUMENTS

EP 2985366 A1 2/2016
EP 3536909 A1 9/2019

OTHER PUBLICATIONS

Written Opinion of the International Searching Authority dated May 10, 2021, issued in corresponding International Application No. PCT/FR2021/050298, filed Feb. 19, 2021, 4 pages.
(Continued)

*Primary Examiner* — Christopher R Legendre
(74) *Attorney, Agent, or Firm* — Christensen O'Connor Johnson Kindness PLLC

(57) ABSTRACT

A composite platform for a fan of an aircraft turbine engine. The platform includes an elongate wall and is configured to extend between two fan blades. The wall includes an aerodynamic outer surface and an inner surface, on which a fastening tab is located, wherein the fastening tab is configured to be attached to a fan disc. The fastening tab is integrally formed with a metal reinforcement which has a plate having an elongate shape and which extends over more than 50% of the longitudinal extent of the wall, the wall being produced by overmolding a resin on the plate so as to be integrated into the wall.

15 Claims, 5 Drawing Sheets

(56) References Cited

U.S. PATENT DOCUMENTS

| | | | |
|---|---|---|---|
| 11,268,396 B2* | 3/2022 | Karkos | F01D 11/008 |
| 2016/0341071 A1* | 11/2016 | Alarcon | B29C 70/12 |
| 2019/0162119 A1 | 5/2019 | Kling et al. | |
| 2019/0277150 A1 | 9/2019 | Theertham et al. | |
| 2023/0108760 A1* | 4/2023 | Minervino | B29D 99/0028 415/220 |

OTHER PUBLICATIONS

International Preliminary Report on Patentability dated Sep. 6, 2022, issued in corresponding International Application No. PCT/FR2021/050298, filed Feb. 19, 2021, 1 page.

International Search Report dated May 10, 2021, issued in corresponding International Application No. PCT/FR2021/050298, filed Feb. 19, 2021, 2 pages.

Written Opinion of the International Searching Authority dated May 10, 2021, issued in corresponding International Application No. PCT/FR2021/050298, filed Feb. 19, 2021, 5 pages.

* cited by examiner

[Fig.1]
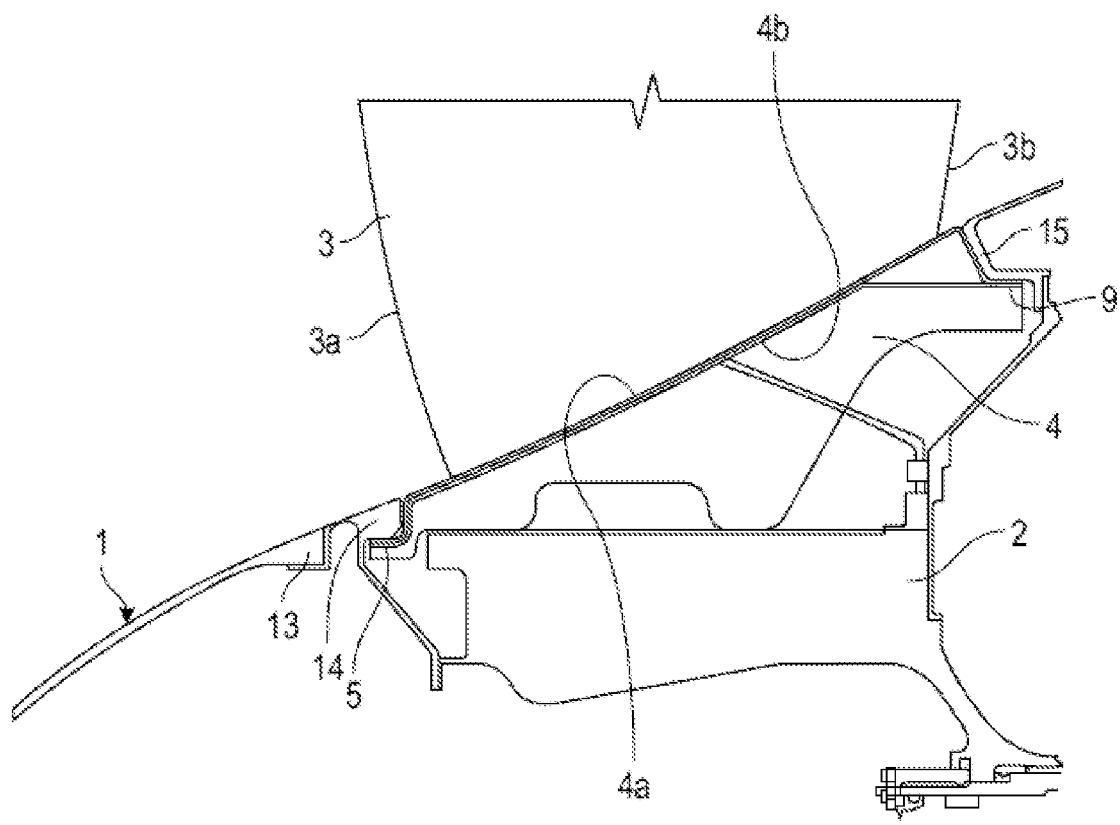

[Fig.2]
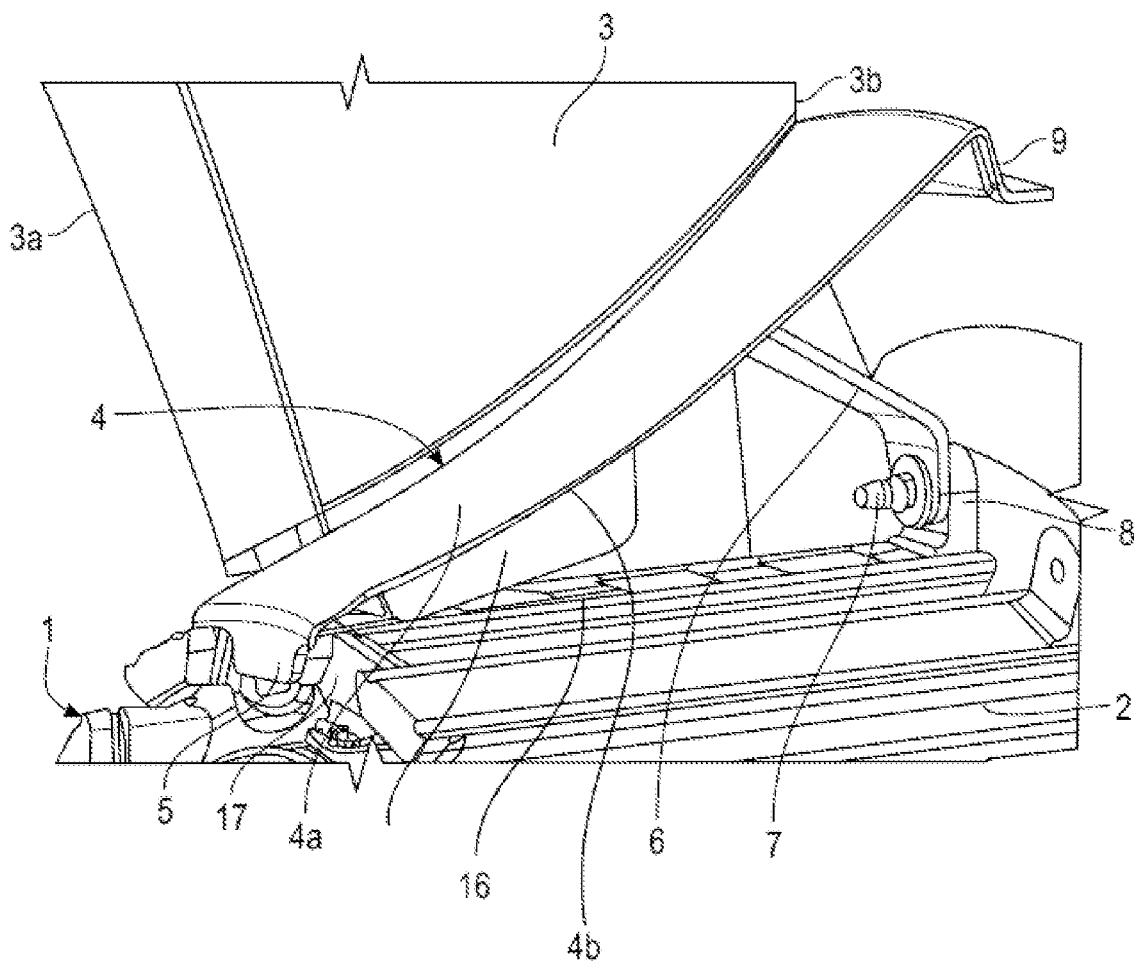

[Fig.3]
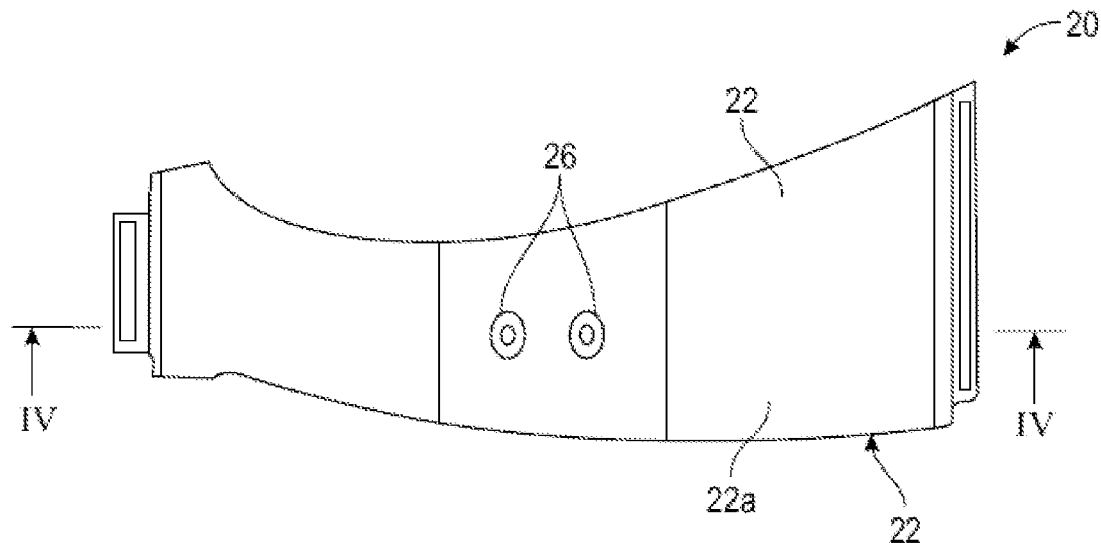
[Fig.4]
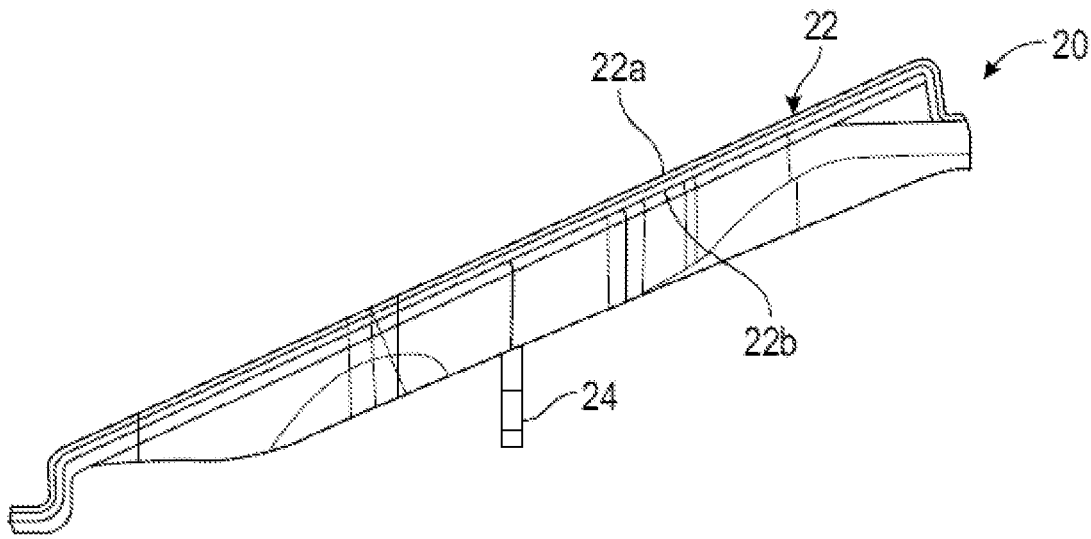

[Fig.5]
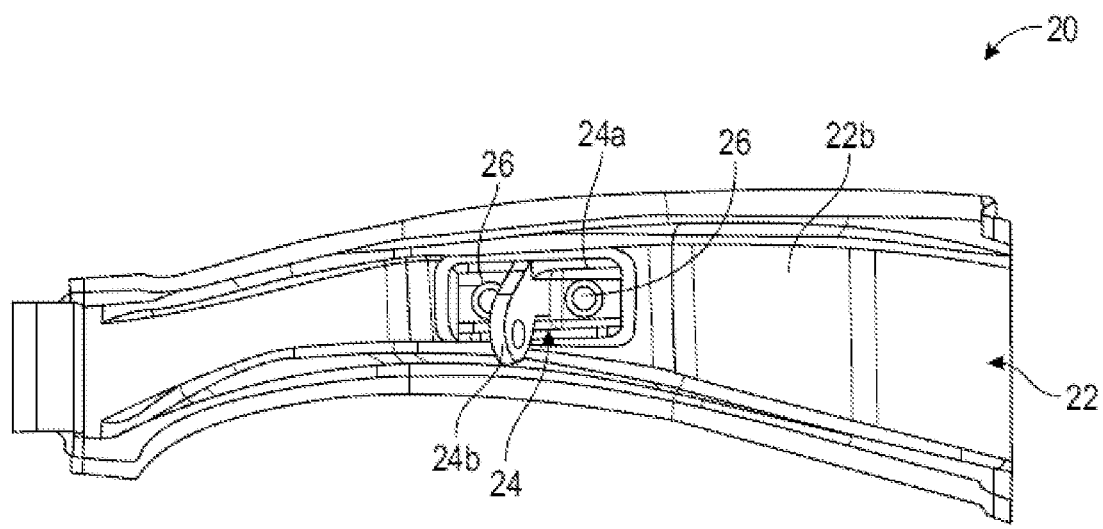
[Fig.6]
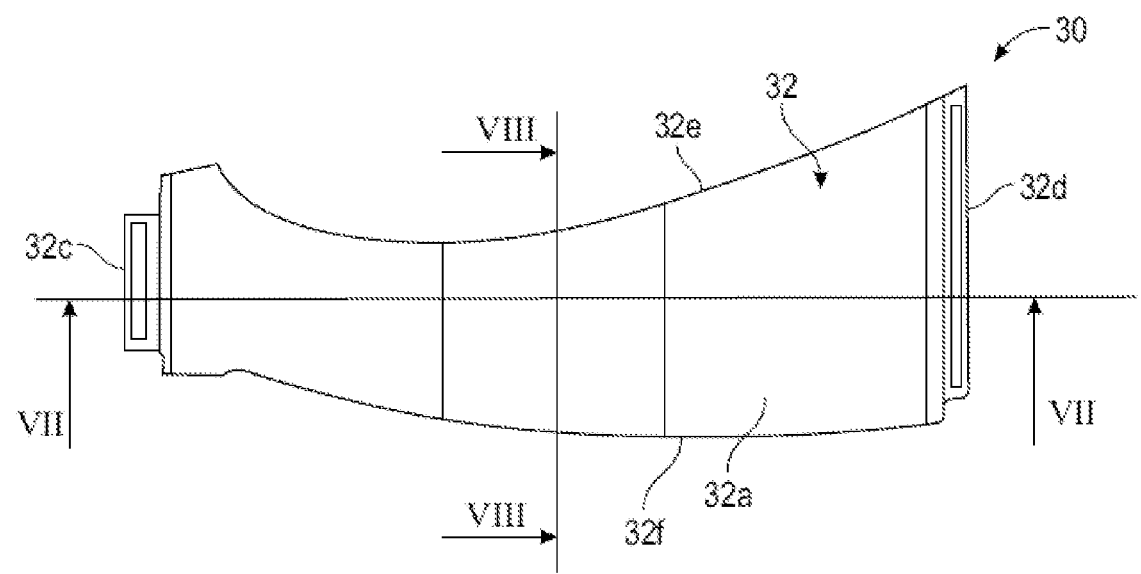

[Fig.7]
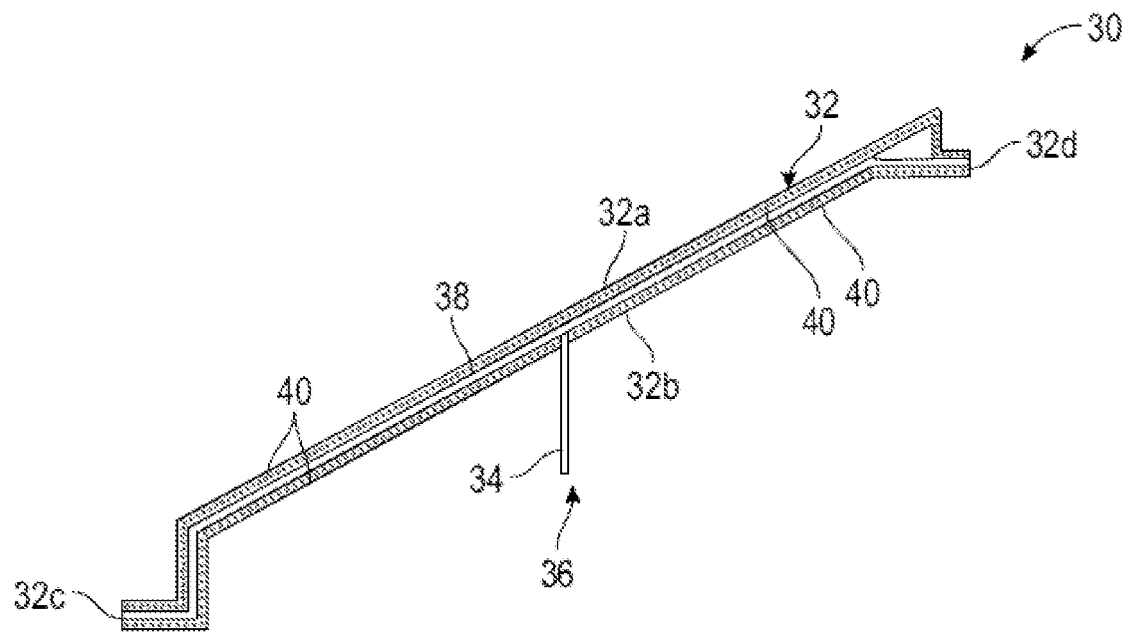
[Fig.8]
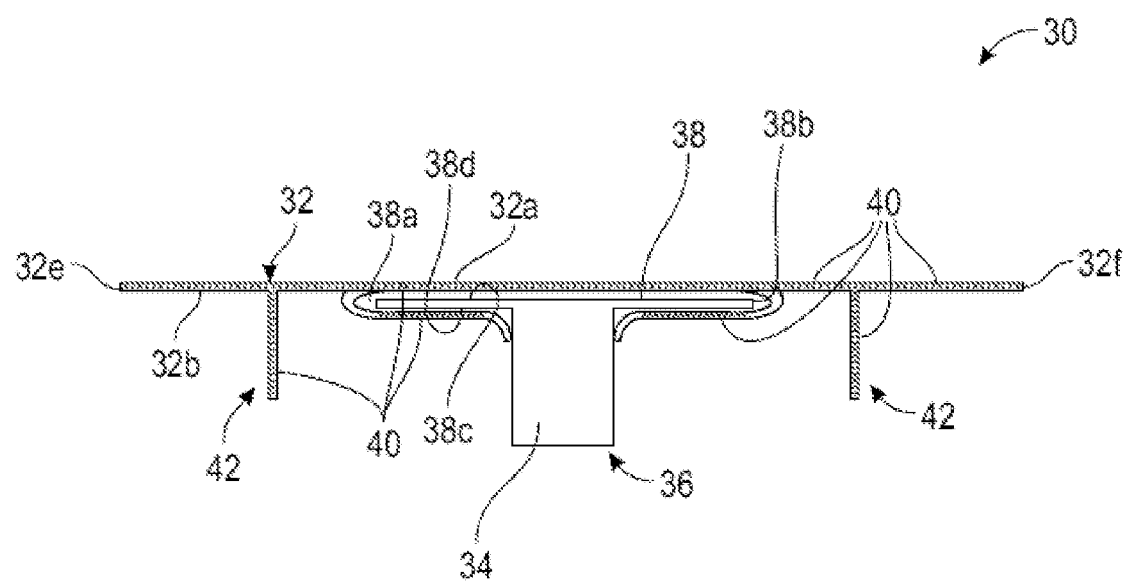

COMPOSITE PLATFORM FOR A FAN OF AN AIRCRAFT TURBINE ENGINE

TECHNICAL FIELD

Embodiments of the present disclosure relate to a composite platform for an aircraft turbine engine fan.

TECHNICAL BACKGROUND

The technical background comprises in particular the documents EP-A1-3 536 909, US-A1-2019/277150, US-A1-2019/162119 and EP-A1-2 985 366.

Referring to FIG. 1, which shows a partial cross-sectional view of a fan rotor 1 of an aircraft turbine engine, it is known from the prior art that a fan rotor 1 having an axis of rotation and comprising a fan casing, a fan disc 2, fan blades 3 or vanes comprising, as a retention device, roots sleeved into cavities in the periphery of the disc 2. Each blade 3 comprises an intrados, an extrados, a leading edge 3a and a trailing edge 3b.

The fan rotor 1 comprises platforms 4b interposed between the fan blades 3 and attached to the periphery of the disc 2. Each platform 4b comprises an aerodynamic external face 4c extending along the axis substantially from the leading edges 3a to the trailing edges 3b of the blades 3 between which this platform 4b is mounted.

Finally, the rotor 1 comprises an upstream cone 13, an upstream shroud 14 and a downstream shroud 15, the two shrouds 14, 15 being secured to the fan disc 2.

Such a fan rotor is known in particular from the document EP-A1-1 970 537.

Each platform must provide an aerodynamic function that is its primary function and a definition of the flow duct for the air.

In addition, each platform must meet all the operating conditions, i.e., ensure the performance for the entire operating envelope, e.g., a flight for an aircraft, ensure the safety requirements, and ensure the availability of the rotor as portion of the engine for a commercial use.

As far as safety is concerned, each platform must be able to absorb a significant amount of energy by crushing its lateral edges, which run along an intrados of a vane and an extrados of an adjacent vane.

It is known to produce fan vanes made of composite material, the use of composite material in the aeronautical field being particularly interesting for their mechanical properties and their gains in mass compared to a metal alloy.

The platforms are generally made of metal alloy. However, it is not conceivable to use metallic platforms with composite vanes because the risk of wear and weakening of the vanes is too high due to the metal-composite contacts.

It has therefore already been proposed to make fan platforms from composite material. However, the currently known technologies are not entirely satisfactory, in particular because the manufacturing method is long and complex and involves a significant production cost.

The present disclosure proposes to solve at least some of these problems in a simple, effective and economical manner.

SUMMARY

Embodiments of the present disclosure relate to a composite platform for a fan of an aircraft turbine engine, comprising a wall of elongated shape and configured to extend between two fan vanes, this wall comprising an aerodynamic external face and an internal face on which is located an attachment tab configured to be attached to a fan disc, wherein the attachment tab is formed in one part with a metallic framework which comprises a plate which has an elongated shape and which extends over more than 50% of the longitudinal extent of the wall, this wall being produced by over-moulding a resin onto the plate so that it is integrated into the wall.

The platform according to the disclosure is designed to reduce its mass while increasing its stiffness and its service life. It is relatively simple to manufacture, by over-moulding a resin on a framework which comprises the attachment tab of the platform. The plate is integrated into the wall and stiffens it over most of its length. There is no particular mechanical assembly step, such as screwing, which simplifies the manufacturing and reduces the cost of manufacturing the part.

The platform according to the disclosure may comprise one or more of the following characteristics, taken alone from each other, or in combination with each other:

the plate extends to upstream and downstream ends of the wall, the wall comprises at least one lateral edge that is curved, the plate comprising at least one lateral edge that is set back with respect to that lateral edge of the wall, the wall comprises a lateral edge that is concavely curved and an opposite lateral edge that is convexly curved, the plate comprising two lateral edges that are set back with respect with the lateral edges of the wall, the plate is at least partly coated with a bonding primer and/or the external face of the wall is at least partly coated with a damping layer, the resin is selected, for example, from the following materials and mixtures thereof: polyaryletherketones, polyetherimides, semi-aromatic polyamides, and polyamides, the resin is reinforced by reinforcements comprising fibres and/or at least one possibly prepreg lap, stiffeners are projecting from the internal face of the wall and are made of resin, the plate comprises an external surface and an internal surface connected to the attachment tab, the reinforcements extending at the level of the external and internal surfaces of the plate or even in the stiffeners.

Embodiments of the present disclosure also relate to an aircraft turbine engine, wherein the turbine engine comprises a fan comprising a disc carrying vanes and platforms as described above.

DESCRIPTION OF THE DRAWINGS

Other characteristics, purposes and advantages of the present disclosure will become apparent from the following detailed description and from the attached drawings, which are given as non-limiting examples and in which:

FIG. 1 is a schematic axial sectional view of a fan rotor according to the prior art;

FIG. 2 is a schematic perspective view of the fan rotor in FIG. 1;

FIG. 3 is a schematic perspective view of a composite platform, seen from above or from the outside and which does not make part of the disclosure;

FIG. 4 is a schematic cross-sectional view along the line IV-IV of FIG. 3;

FIG. 5 is another schematic perspective view of the platform in FIG. 3, seen from below or from the inside;

FIG. 6 is a schematic perspective view of a composite platform according to one embodiment of the disclosure;

FIG. 7 is a schematic cross-sectional view along line VII-VII of FIG. 6; and

FIG. 8 is a schematic cross-sectional view along line VIII-VIII of FIG. 6.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 has been described above and FIG. 2 shows a perspective view of a portion of the fan rotor 1 in FIG. 1. FIGS. 1 and 2 illustrate the prior art.

The rotor 1 is mounted to rotate about an axis of rotation and comprises a fan disc 2 and fan blades 3 comprising roots sleeved into cavities in the periphery of the disc 2, only one blade 3 of which is visible in FIG. 2. Each blade 3 comprises an intrados, an extrados, a leading edge 3a and a trailing edge 3b.

A periphery of the disc 2 is advantageously toothed by being equipped with teeth 16, advantageously of trapezoidal cross-section and extending axially on the disc 2 with respect to the axis of rotation of the rotor 1. At least one wedge 17 is provided on the upstream side between two adjacent teeth 16 which form a cavity for receiving a root of a blade 3, this wedge 17 being intended to axially block the blade root in its corresponding cavity.

Platforms 4 are interposed between the fan blades 3 and attached to the periphery of the disc 2. Each platform 4 can therefore be interposed between two consecutive fan blades 3.

Each platform 4 comprises an internal face 4b (or radially internal with reference to the axis) and an aerodynamic external face 4a. These faces 4a, 4b extend along the axis substantially from the leading edges 3a to the trailing edges 3b of the two blades 3 between which this platform 4 is mounted.

At its upstream end (with reference to the flow of gases in the fan and the turbine engine), each platform 4 comprises a rim 5 for attachment or hooking to the disc 2. A similar rim 9 is located at the downstream end of each platform 4.

The internal face 4b of each platform 4 is connected to an attachment tab 6 on a flange 8 of the disc 2. This tab 6 extends radially inwards and comprises at its radially internal free end an orifice for the passage of a screw 7 for attaching the tab and the platform 4 to the flange 8 and thus to the disc 2.

The platform 4 visible in FIGS. 1 and 2 is made of a single part of metal alloy, and the present disclosure proposes a composite platform that can be used, for example, with fan vanes also made of composite.

FIGS. 3 to 5 describe an example embodiment of a composite platform that is not part of the disclosure.

The composite platform 20 of FIGS. 2 to 5 comprises an elongated wall 22 configured to extend between two fan vanes.

This wall 22 comprises an aerodynamic external face 22a and an internal face 22b on which is located an attachment tab 24 similar to the tab 6 described above.

The attachment tab 24 is made of a metal alloy and comprises a hub 24a connected to an ear 24b pierced with an orifice 24c for the passage of a screw (similar to the screw 7 described above).

The hub 24a is flat and is applied to the internal face 22b of the wall 22. The wall 22 is made of a composite material from a resin. The wall 22 comprises, substantially in the middle, orifices that are aligned with orifices in the hub 24a and that receive screws 26 for attaching the tab 24 to the wall 22. Each screw 26 comprises a head, preferably countersunk, engaged in a recess of the external face 22a of the wall, and a threaded rod on which is screwed a nut bearing on the hub 24a.

This composite platform technology is not entirely satisfactory because it has disadvantages.

The positioning of the tab 24 on the wall 22 requires a high degree of precision (and therefore a high cost) in order to respect the geometrical constraints imposed by aerodynamics. In addition, the screw heads 26 must be covered in order to maintain the aerodynamic geometry of the duct, which also generates an additional cost by adding a covering step that is delicate and complex to control. In addition, the fact that the screw heads are covered with a coating makes it more difficult to locate them for eventual dismounting of the tab and removal of the platform for its replacement, for example.

Each platform 20 has a large mass, about 1 kilogram each, for example a fan rotor comprising eighteen platforms 20.

An over thickness of the wall 22 at the level of the screws 26 and the hub 24a is necessary to reduce the caulking force in the wall, generated by its clamping; clamping which must also resist the centrifugal forces seen by the part: the clamping shape must be greater than the sum of the caulking and centrifugal forces ($F_{clamping} > F_{caulking} + F_{centrifugal}$).

The clamping force is all the more difficult to maintain because the countersunk heads of the screws 26 cannot support washers in line with their heads, which contributes to a poor distribution of clamping forces and requires a smaller volume of material.

The geometrical behaviour of each platform 20 during the engine operation as a result of centrifugal forces. The slightest deformation causes the fan to lose efficiency. Similarly, the use of screws 26 with countersunk head reduces the volume of material loaded by the assembly and significantly increases local constraints, especially at the level of the screw heads.

These last two points generate the need for a very controlled tightening of screws (torque wrench) and therefore expensive.

The durability following the covering step for the screw head. In principle, the part should last the entire life of the engine without deterioration. The erosion combined with local constraints cast doubt on the possibility of meeting this criterion.

The disclosure allows to remedy at least some of these problems and proposes a platform, one embodiment of which is shown in FIGS. 6 to 8.

The composite platform 30 comprises an elongated wall 32 configured to extend between two fan vanes.

This wall 32 comprises an aerodynamic external face 32a and an internal face 32b on which is located a tab 34 for attachment to a fan disc.

The wall 32 further comprises an upstream edge 32c, a downstream edge 32d, a concavely curved lateral edge 32e, and a convexly curved lateral edge 32f. It is understood that the concavely curved edge 32e extends along an extrados of a vane, from the leading edge to the trailing edge of that vane, and that the convexly curved edge 32f extends along an intrados of an adjacent vane, from the leading edge to the trailing edge of that adjacent vane. At each of the axial ends of the wall, at the level of the edges 32c, 32d, the wall may have a rim or form a step. These ends are intended to cooperate with the shrouds of the fan rotor, as mentioned above in connection with FIG. 1.

The attachment tab 34 is formed in one part with a metallic framework 36 which is at least partly integrated into the wall 32, the wall 32 being made by over-moulding a resin onto the framework 36 so that no attachment screws or the like are used.

The framework 36 comprises a plate 38 that extends along the wall 32, for at least 50% of its longitudinal extent and is connected to the attachment tab 34. From FIG. 7, it can be seen that the plate 38 can extend to the upstream and downstream ends of the wall 32. FIG. 8 shows that the plate 38 comprises two lateral edges 38a, 38b that are set back with respect to the lateral edges 32e, 32f of the wall 32. The edges 32e, 32f of the wall 32 are thus made of resin and do not comprise any metallic portion of the plate, which is particularly important because these edges are likely to come into contact with a vane and be crushable by this vane in the event of breakage of the latter. The "fuse" function of these edges is indeed an important criterion of these platforms for the safety criterion.

The framework 36 and in particular the plate 38 can be at least partly coated with a bonding primer or be subjected to a surface treatment, in order to improve the mechanical strength of the resin on the framework.

The framework 36 can be made of aluminium, titanium, or steel and manufactured by casting, forging, stamping and welding, machining, electro-erosion or additive manufacturing, etc. It can be hollow and/or recessed.

The resin of the wall 32 is thermoplastic or thermosetting and is, for example, selected from the following materials and mixtures thereof: polyaryletherketones, polyetherimides, semi-aromatic polyamides, and polyamides.

The resin is preferably reinforced by reinforcements 40 comprising fibres (e.g. glass or carbon) and/or at least one possibly prepreg lap. For example, the lap can be woven or non-woven and formed from carbon fibres, thermoplastic (PET), glass, aramid etc.

As seen in FIG. 7, the reinforcements preferably extend along the entire longitudinal extent of the wall 32. FIG. 8 shows that the reinforcements 40 further extend across the entire transverse extent of the wall 32.

They also extend into stiffeners 42 projecting from the internal face 32b of the wall 32.

The reinforcements 40 and the resin cover the external surface 38c and an internal surface 38d of the plate 38, this internal surface being connected to the attachment tab 34.

The external face 32a of the wall 32 may be at least partly coated with a damping layer (not shown). This layer (bi-material over-moulding, painting, film bonding, etc.) can contribute to the modification of the natural frequencies of the part or to the dynamic handling of the whole fan rotor.

The platform 30 is made by over-moulding the resin on the framework, by a hot resin injection method in a mould, which is well known to the person skilled in the art. The injection temperature in the mould depends on the resin and is for example between 100 and 400° C. (and for example between 100 and 300° C. for a thermosetting resin and between 150 and 400° C. for a thermoplastic resin). When using a carbon reinforcement 40 of the thermoplastic prepreg type, the melting temperature of the thermoplastic of the prepreg is preferably lower than the processing temperature of the injected thermoplastic.

The disclosure provides several advantages:

An estimated weight saving of 10 to 20% per part, by eliminating screws, nuts, and washers. The mass of the platform can be minimized through an optimized design of the framework (thickening in constrained locations, possibility to dig/hollow out the framework, optimization of its shape and dimensions, etc.).

A guarantee that the aerodynamic face 32a remains smooth over time, without air flow disturbance, following the elimination of the screws and a better holding of the part following an overall stiffening of the part due to the framework and/or the reinforcements and/or the stiffeners.

A gain in the price of the part that may not require a touch-up operation at the exit of the mould. It is no longer an assembly of several parts but a single part due to the integration of several functions (stiffeners, fusible edges, etc.).

A simplified mounting and manufacturing. The part being finished, it can be mounted directly. Its geometry and dimensions are ensured by the mould. The final geometry is controlled because the positioning of the metallic framework directly in the mould allows to guarantee the reproducibility of the shape.

An improvement in the service life of the part since the clamping constraints are zero and the force passes through the metallic framework.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A composite platform for a fan of an aircraft turbine engine, said composite platform comprising:
    a wall of elongated shape and configured to extend between two fan vanes, the wall comprising an aerodynamic external face and an internal face, the wall having a first longitudinal dimension;
    a metallic framework configured to be attached to a fan disc;
    the metallic framework formed of a single part including:
        a first portion forming an attachment tab;
        a second portion forming a plate, said plate having an elongated shape and a second longitudinal dimension which represents at least 50% of said first longitudinal dimension and at most 100% of said first longitudinal dimension,
    wherein said wall is produced by over-moulding a resin onto said plate such that the wall wraps around the plate, and wherein the attachment tab extends inwardly from the wall.

2. The platform of claim 1, wherein said second longitudinal dimension represents 100% of said first longitudinal dimension.

3. The platform of claim 1, wherein the wall comprises at least one lateral edge that is curved, and wherein the plate comprises at least one lateral edge that is set back with respect to said at least one lateral edge of the wall.

4. The platform of claim 1, wherein the wall comprises a first lateral edge that is concavely curved and an opposite second lateral edge that is convexly curved, and wherein the plate comprises two lateral edges that are set back with respect to the first and second lateral edges of the wall.

5. The platform of claim 1, wherein the plate is at least partly coated with a bonding primer and/or the aerodynamic external face of the wall is at least partly coated with a damping layer.

6. The platform of claim 1, wherein the resin is selected from the group consisting of polyaryletherketones, polyetherimides, semi-aromatic polyamides, and polyamides.

7. The platform of claim 1, wherein the resin is reinforced by reinforcements comprising fibres or at least one prepreg lap.

8. The platform of claim 1, wherein stiffeners project from the internal face of the wall and are made of resin.

9. The platform according to claim 7, wherein said second portion of the metallic framework comprises an external surface and an internal surface, and wherein the reinforcements extend on said external and internal surfaces.

10. The platform according to claim 7, wherein said second portion of the metallic framework comprises an external surface and an internal surface, and wherein the reinforcements extend on said external and internal surfaces and to stiffeners projecting from the internal face of the wall.

11. The platform according to claim 1, wherein said second portion of the metallic framework comprises an external surface and an internal surface, and wherein said wall is produced by over-moulding said resin onto said external and internal surfaces.

12. An aircraft turbine engine, comprising a fan comprising a disc carrying vanes and one or more platforms according to claim 1.

13. A composite platform for a fan of an aircraft turbine engine, said composite platform comprising:
- a wall of elongated shape and configured to extend between two fan vanes, the wall comprising an aerodynamic external face and an internal face, the wall having a first longitudinal dimension;
- a metallic framework configured to be attached to a fan disc;
- stiffeners projecting from the internal face of the wall;
- the metallic framework formed of a single part including:
  - a first portion forming an attachment tab;
  - a second portion forming a plate, said plate having an elongated shape and a second longitudinal dimension which represents at least 50% of said first longitudinal dimension of said wall,
- wherein said wall is produced by over-moulding a resin onto said plate such that the wall wraps around the plate, and wherein the attachment tab extends inwardly from the wall.

14. The platform according to claim 13, wherein said stiffeners are made of a resin.

15. The platform according to claim 14, wherein said resin is used to produce said wall is made from said resin.

* * * * *